Aug. 18, 1959   N. R. CASTELLINI ET AL   2,900,633
RADIO DIRECTION FINDER
Filed June 30, 1954   2 Sheets-Sheet 1
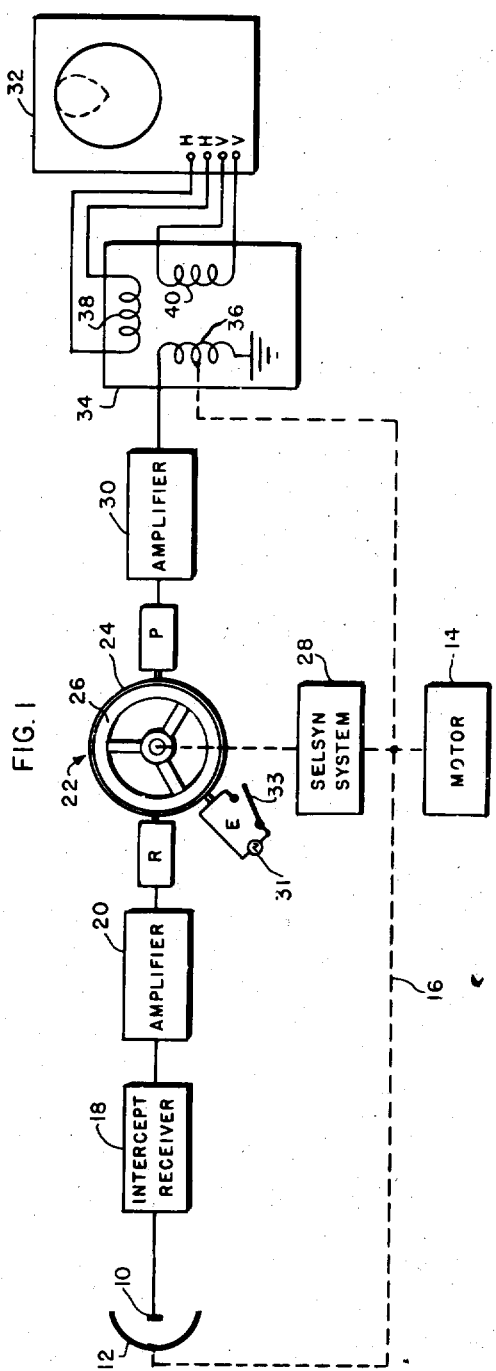
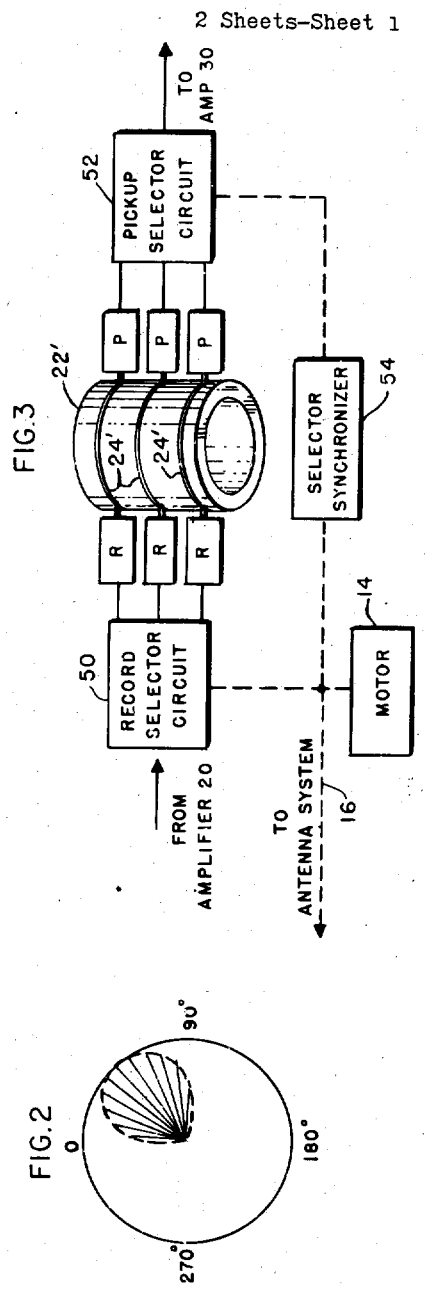
INVENTOR.
ANTHONY J. DI GIACOMO
NELLO R. CASTELLINI
BY
Harry M. Daragovitz
ATTORNEY INVENTORS,
ANTHONY J. DI GIACOMO
NELLO R. CASTELLINI.
BY
Harry M. Saragovitz
ATTORNEY.

United States Patent Office 2,900,633
Patented Aug. 18, 1959

2,900,633

RADIO DIRECTION FINDER

Nello R. Castellini, Red Bank, and Anthony J. Di Giacomo, Interlaken Estates, N.J., assignors to the United States of America as represented by the Secretary of the Army Application June 30, 1954, Serial No. 440,568

5 Claims. (Cl. 343—118)

(Granted under Title 35, U.S. Code (1952), sec. 266)

The invention described herein may be manufactured and used by or for the Government for governmental purposes, without the payment of any royalty thereon.

This invention relates generally to a radio direction finder of a type in which lines or patterns indicative of the direction of reception are traced by a line-tracing device, and more particularly to an apparatus for automatically averaging the radio signal intercepts.

The probability of intercept between rotating beam transmitting and receiving antennas is principally a function of their relative rotational rates, elevation angles and beam widths. To obtain an accurate and readily discernible direction or bearing indication, it is desirable that the transmitted signal source to be located illuminate the receiving antenna for a period corresponding to the entire beam width of the receiving antenna. Under these conditions, the entire polar response pattern of the receiving antenna is presented on a bearing indicator, usually a cathode-ray tube, and the line bisecting this pattern is the correct bearing of the transmitter with respect to the receiving antenna. However, such an ideal complete pattern may not always be obtained because of the relative beam widths and rotational rates of the rotating beam transmitting and receiving antennas. As is often the case with broad beam receiving antennas, the bearing intercepts are only segments of the receiving antenna polar pattern so that the bisector of any one of these segments would very often result in an erroneous bearing indication. Although such errors may be minimized by manually averaging the bearings indicated by each of the intercept segments, such a process is both time-consuming and tedious.

It is therefore an object of the present invention to provide an improved and simplified radio signal direction finder overcoming the aforesaid limitations.

It is another object of the present invention to provide a radio signal direction finder wherein a true bearing reading is readily discernible.

It is still another object of the present invention to provide a radio signal direction finder wherein successive intercepts are stored and reproduced to outline the complete receiving antenna response pattern.

It is yet another object of the invention to provide a means for automatically averaging successive radio signal intercepts to permit an accurate azimuth determination of the received signals.

In accordance with one embodiment of the present invention, the radio direction finder includes a receiving antenna having a directive pattern and adapted to intercept the rotating beam of a transmitting antenna, and means for controlling the receiving antenna to cause the directive pattern to rotate. Also included are means for detecting the received radio signal intercepts and means driven synchronously with said receiving antenna for recording and reproducing successive detected signals whereby the amplitude and angular displacement of discrete reproduced signals correspond to the amplitude and angular displacement of the discrete signals when intercepted by the receiving antenna. Also included are indicating means responsive to the reproduced signals and including a cathode ray line trace driven synchronously with the rotation of the directive pattern whereby successive reproduced signals outline the receiving antenna response pattern.

In accordance with another embodiment of the invention, the radio direction finder comprises means for selectively recording and reproducing signals intercepted during a prescribed angular displacement of the receiving antenna, and means for selectively outlining the reproduced signals received during a particular angular displacement of the receiving antenna.

For a better understanding of the invention, together with other and further objects thereof, reference is had to the following description taken in connection with the accompanying drawing in which:

Figure 1 is a block diagram of a radio signal direction finder in accordance with the present invention;

Figure 2 illustrates a direction finding pattern for a pulsed radiation source which may be produced by the arrangement of Figure 1;

Figure 3 illustrates another embodiment of the present invention; and

Figure 4:
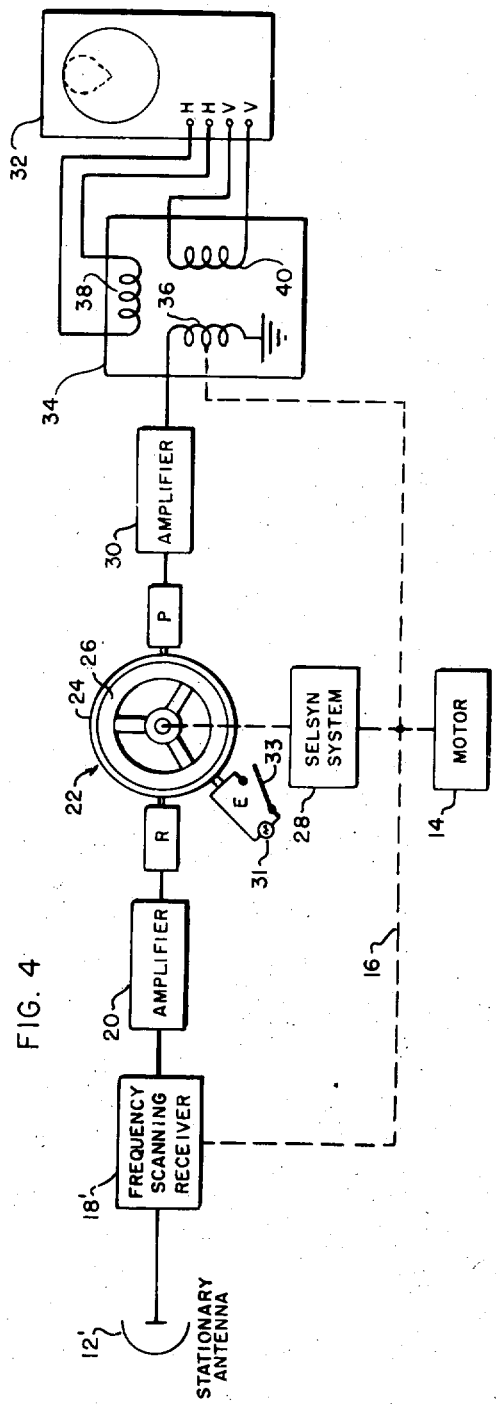
Figure 4 illustrates an embodiment of the present invention adapted for frequency measurement of a pulsed radiation source.

Referring now to Figure 1 of the drawing, the radio signal direction finder comprises a receiving pickup or antenna system having a directive pattern in space of prescribed beam width. This pickup system is provided by receiving antenna source 10 and a reflector 12. The direction finder includes means for controlling the pickup system to cause its directive pattern to rotate, such means comprising a motor 14 mechanically coupled, as indicated by the broken line 16, to the receiving antenna source 10 and its associated reflector 12. The signal output of antenna system 10, 12 is applied to intercept receiver 18 which comprises the usual radio-frequency, intermediate-frequency and detector circuits of conventional design to provide a demodulated or detected intercept output signal. Since the antenna system 10, 12 has a directive pattern in space, the orientation of which varies relative to the direction of reception of a desired intercepted signal, the amplitude of the demodulated signal output from receiver 18 varies in accordance with this relative orientation and also in accordance with the field strength of the radiated signal being received. The demodulated intercepted output signal from receiver 18 is fed through amplifier 20 to a storage device 22 adapted to record and reproduce the demodulated signals. Storage device 22 includes a moving magnetic recording tape 24 or other suitable recording medium carried by a drum or wheel 26 of non-magnetic material which is rotatably driven in synchronism with antenna system 10, 12 by means of motor 14 through a suitable selsyn system 28. The detected signal from amplifier 20 is recorded on the tape 24 by means of a magnetic recording element R. At the end of a predetermined rotation of the tape 24, the detected intercept signal is reproduced by means of a pickup unit P and the reproduced signal is applied to the input circuit of amplifier 30. Since the magnetic drum 26 is rotating synchronously with the antenna system 10, 12, the angular displacement and amplitude of any one discrete detected signal recorded on tape 24 and reproduced by pickup unit P corresponds to the angular displacement and amplitude of the discrete signal as intercepted by antenna system 10, 12. An erasing unit E supplied with an alternating current from a source 31 and a switch 33 may be provided to wipe off or erase the recorded signals when they are no longer needed.

The amplified reproduced signal from amplifier 30 is applied to a cathode ray tube line-tracing device 32 through a two-phase synchronous resolver circuit 34. The construction of such cathode ray tube devices is well known and further description thereof is believed unnecessary. Cathode ray tube line-tracing device 32 is provided with conventional horizontal and vertical beam deflecting means, designated as H, H and V, V respectively. Resolver 34 includes a rotor winding 36, to which the output of amplifier 30 is applied, synchronously driven with the antenna system 10, 12 through motor 14, and two stator windings 38 and 40 oriented at right angles to one another. As is well known, the output of resolver stators 38 and 40 produces vertical and horizontal components of the reproduced signals applied from amplifier 30 to resolver rotor 36. The horizontal components are applied to the horizontal deflecting plates H, H of cathode ray tube line-tracing device 32, preferably through a pair of push-pull arranged amplifiers, and the vertical components are applied to vertical deflecting plates V, V, also preferably through a pair of push-pull amplifiers. With such an arrangement, the resulting cathode ray line trace is a radius vector of the signal voltage which rotates about the center of the cathode ray tube device in synchronism with antenna system 10, 12. It is to be understood, of course, that any other suitable sweep scan control device may be utilized to achieve the aforementioned line trace. The observation end or screen of tube 32 may be provided with a suitable compass scale, not shown, to facilitate obtaining direct bearing indications.

In operation, all of the signals intercepted by antenna system 10, 12 will be detected by receiver 18 and recorded on tape 24. Inasmuch as both the recording tape 24 and antenna system are rotated in synchronism, the detected and recorded intercepted signal will correspond both in azimuth and amplitude to the signal as intercepted by the antenna system. As the signal is reproduced it is applied to cathode ray tube line-tracing device 32 which is being scanned in synchronism with the antenna system by means of resolver circuit 34. The bearing indicator compass scale (not shown) may be suitably calibrated to account for the angular displacement of recording element R and pickup element P. Thus, as the discrete signal intercepts from any one signal source are detected, recorded, reproduced, and presented on cathode line-tracing device 32, a pattern will appear on the screen of the cathode ray tube line-tracing device which will be a reproduction of the complete antenna intercept pattern. Such a pattern for a pulsed transmitter source is illustrated in Figure 2, with the line traces within the pattern representing the discrete pulses received from the pulsed radiation source. The storage of a sufficient number of individual intercepts so as to outline the complete antenna response pattern serves as an automatic averaging device thereby permitting a more accurate azimuth determination of the received signals than if such intercepts were not recorded and reproduced. The bisector of the intercept pattern will thus produce a true indication of the bearing of the radio signal source. Due to the remanence of storage device 22 on drum 26, the bearing pattern will be reproduced once for each drum revolution. The repetitious reproduction of the recorded information provides a convenient and leisurely means for analyzing the intercepts without interference by extraneous intercepts. For example, such repetitious reproduction will provide a convenient means of determining the PRF of the received radar signals by counting the intercepts and deriving the PRF information from the known receiving antenna rotation speed. Without such recording and reproducing means, the duration of the pattern on the cathode-ray tube line tracing device 32 would be too short to afford accurate measurements. This is especially true for signals of extremely short duration and of very low repetition frequency.

If sector scanning is desired the storage unit 24 may comprise parallel spaced magnetic tapes or other suitable recording medium 24' mounted on drum 22', each tape having respective recording and reproducing heads as shown in Figure 3. By utilizing well known conventional selector circuits as at 50, 52 and 54, the intercepts for any particular sector may readily be reproduced and displayed on cathode ray tube line-tracing device 32 in the manner hereinabove described.

Recording and reproducing unit 22 of Figure 1 may also be utilized to determine the frequency of a radiation source when used in conjunction with a frequency scanning type receiver. Such a system is shown in Fig. 4 where like numerals refer to like components. In such a system the receiving antenna 12' is stationary and the line trace of the cathode ray line-tracing device 32 and magnetic tape 24 is synchronously driven with the frequency sweep tuning cycle applied to the frequency scanning receiver 18'. In this application, the angular displacement of the cathode ray trace will determine the frequency of received signals.

While there has been described what is at present considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. In a radio signal direction finder including a rotatably driven receiving antenna having a predetermined beam width and a directive pattern and adapted to intercept the beam of a transmitting antenna, means for outlining the antenna response pattern of said receiving antenna corresponding to said beam width, comprising means for demodulating the signals intercepted by said antenna, means driven synchronously with said receiving antenna for magnetically recording and magnetically reproducing successive demodulated signals whereby the respective amplitude and angular relationship of successive discrete intercept signals are maintained and reproduced in said relationship for a prescribed duration, said angular relationship being determined with respect to a prescribed azimuth direction, and indicating means responsive to said reproduced signals and including a cathode ray line trace synchronously driven with said receiving antenna whereby the successive reproduced intercept signals outline the receiving antenna response pattern.

2. A radio signal direction finder comprising a receiving antenna having a directive pattern, means for controlling said receiving antenna to cause said directive pattern to rotate, means for demodulating the signals intercepted by said receiving antenna, means driven synchronously with the rotation of said directive pattern to magnetically record and magnetically reproduce successive demodulated intercept signals whereby the respective angular and amplitude relationship of successive discrete intercept signals is maintained for a prescribed duration, a cathode ray tube line-tracing device, and means driven in synchronism with the rotation of said directive pattern and responsive to said reproduced signal for controlling the cathode ray of said device to trace the outline of the receiving antenna response pattern.

3. An apparatus for determining the frequency of a radiation source comprising a receiving antenna for intercepting signals from said source, a frequency scanning receiver adapted to demodulate the intercepted signals and having a predetermined frequency sweep tuning cycle, a cathode ray tube line-tracing device, means for controlling the cathode ray of said device to trace a predetermined line in synchronism with said frequency sweep tuning cycle, and a magnetic signal storage means connected between the output of said receiver and said line trace controlling means for recording and reproducing the demodulated signals whereby the respective angular and amplitude relationship of successive discrete intercept signals received during each frequency tuning cycle is maintained for a prescribed duration, said storage means being synchronously driven with said frequency sweep tuning cycle.

4. A radio-frequency signal receiving apparatus comprising, means for cyclically intercepting radio frequency energy signals, means for demodulating the intercepted signals, means driven synchronously with said intercepting means to magnetically record and magnetically reproduce the demodulated intercept signals whereby the receptive angular and amplitude relationship of successive discrete intercept signals is maintained for a prescribed duration, and indicating means responsive to said reproduced signals and including a cathode-ray line trace driven in synchronism with said reproducing and recording means and said intercepting means.

5. A radio signal direction finder comprising: a rotatably driven receiving antenna adapted to intercept the beam of a rotating transmitting antenna; means for demodulating the signals intercepted by said receiving antenna; storage means comprising a magnetic recording tape driven synchronously with said rotating antenna, a recording element responsive to the demodulated intercept signals and operatively associated with said recording tape such that the respective angular and amplitude relationship of successive discrete signals is recorded and maintained on said recording tape, and a reproducing element operatively associated with said recording tape and adapted to reproduce the successive recorded signal in their respective angular and amplitude relationships; a resolver circuit comprising a rotor element driven synchronously with said rotating antenna and two stator elements relatively oriented at right angles to each other, said rotor element being responsive to said reproduced signals, and a cathode ray line-tracing device responsive to the output of said stator windings and the reproduced demodulated intercept signals for controlling the cathode ray of said device to outline the full intercept response pattern of said receiving antenna.

References Cited in the file of this patent

UNITED STATES PATENTS

| | | |
|---|---|---|
| 2,422,135 | Sanders | June 10, 1947 |
| 2,489,263 | Busignies | Nov. 29, 1949 |
| 2,509,208 | Busignies | May 30, 1950 |
| 2,524,295 | Mesner | Oct. 3, 1950 |
| 2,524,837 | Russell et al. | Oct. 10, 1950 |
| 2,566,189 | Gloess | Aug. 28, 1951 |
| 2,578,268 | Sherwin | Dec. 11, 1951 |
| 2,683,874 | Wainright | July 13, 1954 |
| 2,684,468 | McClure et al. | July 20, 1954 |
| 2,698,433 | Ringoen | Dec. 28, 1954 |

FOREIGN PATENTS

| | | |
|---|---|---|
| 879,741 | France | Nov. 30, 1942 |